United States Patent Office 2,761,472  
Patented Sept. 4, 1956

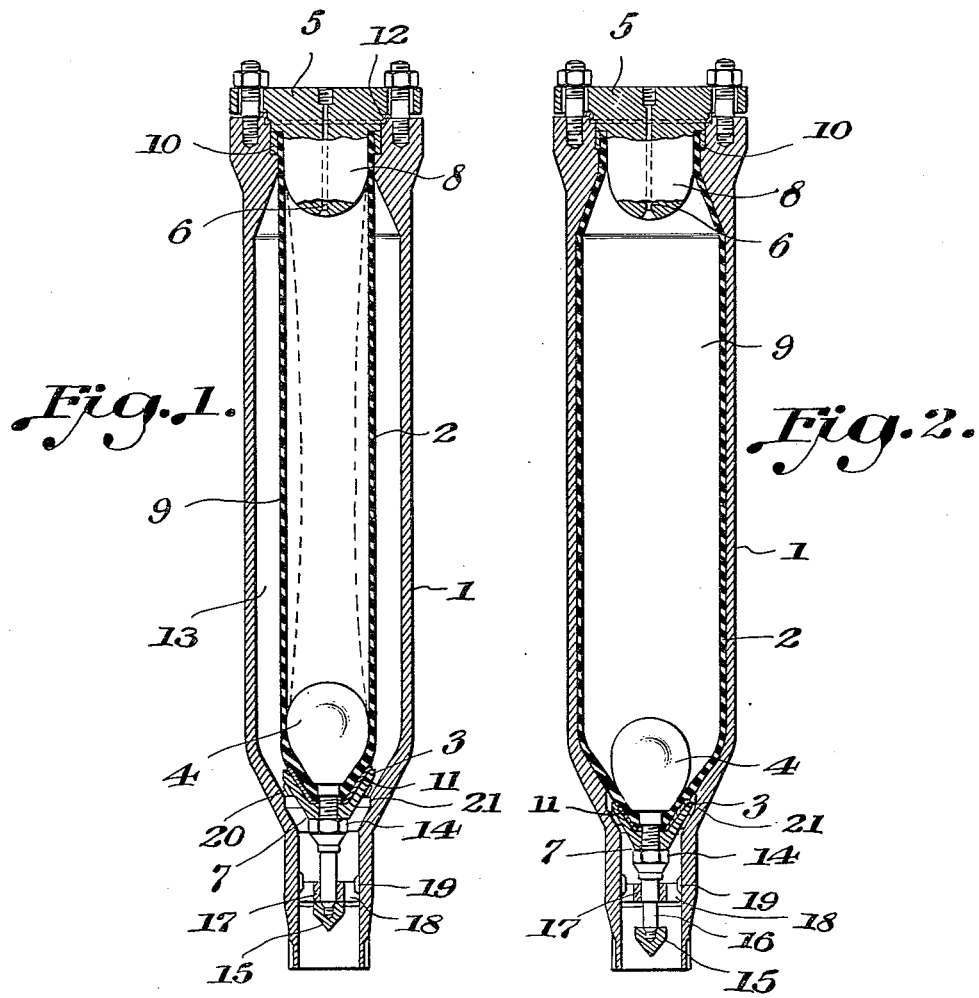

2,761,472

PRESSURE FLUCTUATION ARRESTER

Franz Harbich and Arnold von Pohl, Celle, Germany

Application July 9, 1952, Serial No. 297,822

Claims priority, application Germany October 2, 1951

6 Claims. (Cl. 138—26)

The present invention relates in general to a device for arresting or precluding pressure fluctuations and more particularly to such devices applied in liquid pipe lines and more specifically to pressure pipe lines connected to piston pumps.

The invention has to do with an improvement of customary pressure fluctuation arresting devices which include elastic pressure chambers capable of being charged with compressed air or compressed gas and which elastic pressure chamber actuates a valve closure mechanism.

In such devices when connected into a pipe line carrying liquids, the elastic pressure chamber, under conditions of increased internal pressure, expands and closes off the device by means of the valve, whereas with an increase of liquid pressure externally of the pressure chamber, the valve will be opened due to compression of the elastic pressure chamber.

Heretofore in devices of this character, certain defects were inherent in the structure consisting mainly in an easily occurring deformation or damaging of the elastic pressure chamber acting in the manner of a membrane.

An object of the present invention is to provide a device overcoming the defects of previous known devices and such that even when subjected to sudden and repeated pressure declines in a pipe line connected to the devices, deformation or destruction of the pressure chamber is positively prevented and the elastic pressure chamber is thereby given increased time of efficiency and operation.

A further object of the invention is to provide a device in which overtaxing or jamming of the pressure chamber is impossible and also providing an excellent efficiency of the device which at the same time is susceptible of simple assembling.

A still further object of the invention is to provide a device which reacts immediately and spontaneously to fluctuations of pressure in a liquid line to which attached and which device is capable of being mounted and operating in any desired spatial position.

Other and further objects of the present invention will be apparent from the following detailed description of embodiments of the invention taken together with the accompanying drawing in which Figure 1 is a longitudinal sectional view through the device of the invention having an initially lightly tensed pressure chamber;

Figure 2 is a view similar to Figure 1 showing the pressure chamber in expanded condition and sealing the device against liquid flow.

The pressure fluctuation arrester has a casing 1 in which is mounted a tubular elastic pressure chamber 2 which is given tension (as will be defined hereinafter). The chamber 2 carries at its lower end a valve body 3 with a valve-guide body 4 and the chamber can be charged with compressed air or compressed gas through a bore 6 provided in the cover 5 of the casing 1. The diameter ratio between the interior space of the pressure chamber 2 and of the casing 1 is so proportioned to the length of the pressure chamber 2 that when the chamber 2 is filled with compressed air or gas the valve body 3 settles down in the lower opening 7 before the wall of the pressure chamber 2 comes into contact with the wall of casing 1. Due to this specific construction and proportioning there is advantageously provided that the specific linear expansion of the pressure chamber 2 is equally great overall and is held within narrow limits, so that an overtaxing of the pressure chamber cannot occur.

The pressure chamber 2 is connected at both ends to spherically or similarly curved solid or hollow bodies, of which the lower one at the same time forms the mentioned valve-guide body 4, while the upper one is shaped as a head 8 integral with the cover 5 of the casing 1 and projects into a gas space 9 in the pressure chamber 2. The opening of the vessel 1 is closable by the cover 5, and is made with such dimensions that the pressure chamber 2 together with the valve 3 can be inserted into the casing 1 from above.

At its points of junction with the curved bodies 4 and 8 the pressure chamber 2 is provided with reinforcements 10 and 11 consisting of fabric inserts or the like, so that the upper reinforced chamber portion 10 seals the cover 5, which is capable of being clamped fast, against a metal ring 12, by which means a perfect sealing of the gas space 9 from the liquid space 13 of the casing 1 and of both the spaces 9 and 13 from the outside is attained. At its lower reinforced portion 11 the pressure chamber 2 is firmly clamped in between the valve-guide body 4 and the valve body 3 by means of a nut 14, so that here also a perfect sealing of the gas space 9 from the space 13 is obtained.

The curved solid or hollow bodies 4 and 8, in consequence of their appropriate shaping, prevent a kinking-in and damaging of the pressure chamber even when in consequence of an increase of the external liquid pressure, the volume of the gas contained in the chamber 2 decreases substantially.

The length of the pressure chamber 2 is shorter in the completed but non-inserted state than is illustrated in Fig. 1. As is apparent, the pressure chamber 2 is drawn in Fig. 1 as being initially tensed. This initial tension can be adjusted by a nut 15 coacting with the valve-guide rod 16. The valve-guide rod 16 is guided through a bore 17 of a crosspiece 18. In assembling, this crosspiece 18 is grasped, the pressure chamber 2 is tensed after the placing in position of the cover 5, and the crosspiece 18 fitted into its seat 19 and secured. The initially tensed pressure chamber 2 then has such a length that by itself, in consequence of its initial tension, it keeps the valve 3 fully opened, so that a slight excess pressure of gas in the chamber 2 is required to effect the closure of the valve.

If there is a decrease of the external liquid pressure the charged pressure chamber 2 stretches downward in such a way that the valve body 3, which is provided with ridges 20 forming individual canals for the circulation of the liquid, settles down in the lower opening 7. At its upper end there is left open a narrow annular passage 21, so that due to the expanding pressure chamber 2 the rest of the liquid still remaining in the vessel 1 is pressed out. Only then is the annular passage 21 closed by the lower reinforced portion 11 of the pressure chamber 2, so that a jamming-in of the chamber jacket into this annular passage 21 is prevented. The smooth applying of the pressure chamber 2 against the wall of the casing 1 and avoidance of all jammings are substantially promoted by the fact that the wall of the casing 1 in the vicinity of the lower opening 7 forms a smooth transition with the closed valve body 3.

In the construction as shown in the figures and as above described, the load pressure of the pressure chamber 2 is lesser in amount than the pressure prevailing in the connected pipe-line, so that the liquid space 13 is constantly filled with liquid during operation and the pressure chamber 2 operates in its initially tensed state. Due to this, it can follow the fluctuations of pressure in the liquid space practically without inertia, particularly since its jacket can flutter in a rapid rhythm perpendicularly to the longitudinal axis and releases a large compensation volume according to the broken line shown in Fig. 1. In consequence of the initial tension of the pressure chamber the valve body 3 is opened in case of an equality of pressure prevailing between the chamber 2 and the liquid pipe-line. The liquid then flows into the vessel 1 and compresses the contents of the pressure chamber 2 until the latter has again assumed its shape as shown in Fig. 1.

The operation and construction of the device of the present invention will be readily apparent from the foregoing description of the presently-preferred embodiment of the invention shown in the drawing. It is obvious that modifications in detail will be readily apparent to those skilled in the art to which the present invention pertains and yet be within the scope of the present invention as defined in the appended claims.

We claim:

1. A pressure fluctuation arrester adapted for connection in a pipe line subject to pressure fluctuations, comprising an open-ended casing, an elastic open-ended tubular pressure chamber having a length shorter than said casing when in an unstretched condition in said casing, means for closing one end of said casing and means integral with said closing means to close one end of said pressure chamber, said closing means and means integral therewith being provided with a conduit for supplying gas under pressure to said tubular pressure chamber, closure means for the other end of said pressure chamber, said closure means including a valve means adapted to cooperate with said casing adjacent said valve means to substantially close the other end of said casing, guide means in the other end of said casing, and tensioning means guided in said guide means and associated with the closure means on said other end of said pressure chamber for adjustably pretensioning said elastic tubular pressure chamber, whereby, when gas under pressure in said pressure chamber and in said casing are balanced, in the absence of pressure fluctuation in the line the tensioning of said pressure chamber maintains said valve means out of the substantially closed position.

2. A pressure fluctuation arrester as claimed in claim 1, the diameter ratio between said pressure chamber and the interior of said casing being so proportioned to the length of said elastic pressure chamber in the tensioned state that, when the pressure of said gas under pressure in said pressure chamber is greater than the pressure of the medium in the casing due to fluctuation of pressure in the line, said resilient tubular casing is expanded and the valve means is operated to substantially close said other end of said casing, and subsequently the wall of said pressure chamber contacts with and is applied against the internal wall of said casing.

3. A pressure fluctuation arrester as claimed in claim 1, said tensioning means comprising a valve guide rod extending through the closure means for said other end of said pressure chamber in the direction of the longitudinal axis of said pressure chamber, said guide means comprising a cross piece in the said other end of said casing in which said valve guide rod is guided, and an adjustable nut on said guide rod cooperable with said cross piece for adjusting the position of said rod, valve means and pressure chamber with respect to said casing, thereby adjusting the amount of tensioning of said chamber.

4. A pressure fluctuation arrester as claimed in claim 1, said pre-tensioned pressure chamber having a length in initial tension maintaining said valve means open and closure thereof being effected upon a relatively slight excess of pressure in said pressure chamber.

5. A pressure fluctuation arrester as claimed in claim 4, said valve means including a valve body carried at the lower end of said pressure chamber, ridges on said valve body, said valve body coacting with a portion of the internal wall of said casing for closing the opening thereof, said ridges forming with said wall portion narrow passages, reinforcing means on said pressure chamber in proximity to said valve body, said reinforced portion of said pressure chamber closing said passages after complete evacuation of said casing after contact of said chamber against the internal wall of said casing.

6. A pressure fluctuation arrester as claimed in claim 1, a valve body carried by said pressure chamber and forming a part of said valve means, a valve guide body carrying said valve body, a reinforced portion of said pressure chamber being secured between the valve guide body and the valve body, and means securing said valve body, said valve guide body and said reinforced portion together so that a sealing-off of the gas space in said pressure chamber from the liquid space in said casing is attained.

References Cited in the file of this patent

UNITED STATES PATENTS

| | | |
|---|---|---|
| 1,891,636 | Foulds | Dec. 20, 1932 |
| 2,088,042 | Stephens | July 27, 1937 |
| 2,198,192 | Anderson | Apr. 23, 1940 |
| 2,342,356 | Mercier | Feb. 22, 1944 |
| 2,371,633 | Lippincott | Mar. 20, 1945 |
| 2,546,648 | Mercier et al. | Mar. 27, 1951 |
| 2,550,892 | Weber | May 1, 1951 |
| 2,604,118 | Greer | July 22, 1952 |
| 2,630,834 | Weber et al. | Mar. 10, 1953 |